United States Patent [19]
Hirabayashi

[11] Patent Number: 5,608,394
[45] Date of Patent: Mar. 4, 1997

[54] POSITION DETECTING METHOD AND APPARATUS

[75] Inventor: Tomokazu Hirabayashi, Suwa, Japan

[73] Assignee: Seiko Epson Corporation, Tokyo, Japan

[21] Appl. No.: 385,267

[22] Filed: Feb. 8, 1995

[30] Foreign Application Priority Data

| Feb. 8, 1994 | [JP] | Japan | 6-014656 |
| Nov. 9, 1994 | [JP] | Japan | 6-275385 |
| Jan. 11, 1995 | [JP] | Japan | 7-002947 |

[51] Int. Cl.$^6$ ................................ H03M 1/22
[52] U.S. Cl. ................. 341/11; 341/6; 341/7
[58] Field of Search .................. 341/6, 7, 9, 10, 341/11

[56] References Cited

U.S. PATENT DOCUMENTS

| 2,901,170 | 8/1959 | Poole | 341/6 |
| 4,401,483 | 8/1977 | Groff | 341/9 |
| 4,599,601 | 8/1986 | Rammelsberg | 341/11 |
| 4,841,297 | 6/1989 | Bourgeaux et al. | 341/11 |

FOREIGN PATENT DOCUMENTS

| 0300183 | 1/1989 | European Pat. Off. . |
| 58-217005 | 12/1983 | Japan . |
| 4-204210 | 7/1992 | Japan . |

OTHER PUBLICATIONS

Elektrotechnik, vol. 70 No. 22, 16 Dec. 1988 Wurzburg, W. Germany, pp. 38+42, XP 000110970 'Inkremental und absolut'.

*Primary Examiner*—Howard L. Williams
*Attorney, Agent, or Firm*—Eric B. Janofsky

[57] ABSTRACT

A position detecting apparatus and method of determining the detected position utilizing a motor driven incremental encoder to provide a signal indicative of a plurality of reference points and a moving mechanism connected to the output shaft of the motor with a sensor for detecting a plurality of division points wherein the sensor and the detected division points are moved relative to each other. The plurality of division points may be provided at equal intervals, the range of output shaft motion can be detected in the form of interval positions by detecting and measuring the output pulse count from the incremental encoder and detecting the amount of movement via the division points detected by the sensor. Using the relation between the predetermined positions of the division points of the moving mechanism and the known positions of the reference points of the incremental encoder, the absolute value of the position of the output shaft can be precisely determined. In addition, by means of changing the period of the division points of the output shaft, information can be derived as to whether the output shaft is properly within a predetermined operating range and operate the output shaft to maintain it within the operating range.

17 Claims, 6 Drawing Sheets

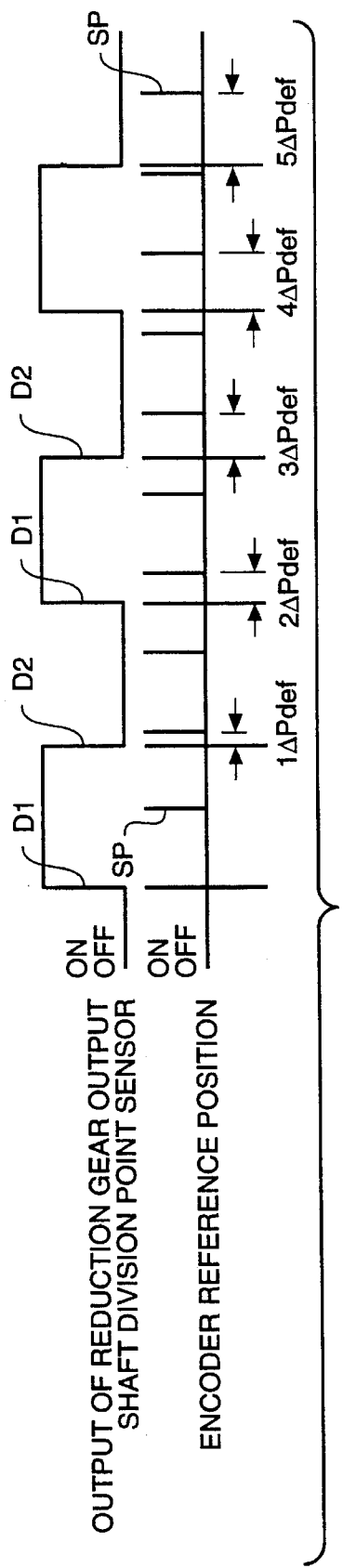
FIG._1
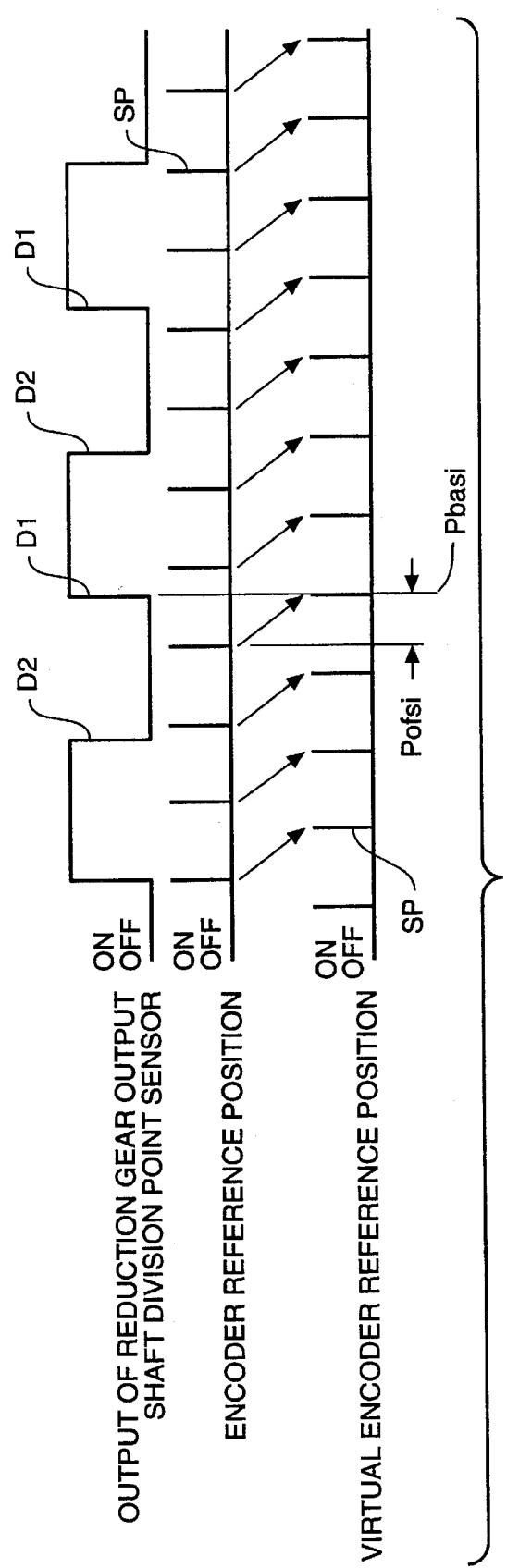
FIG._6

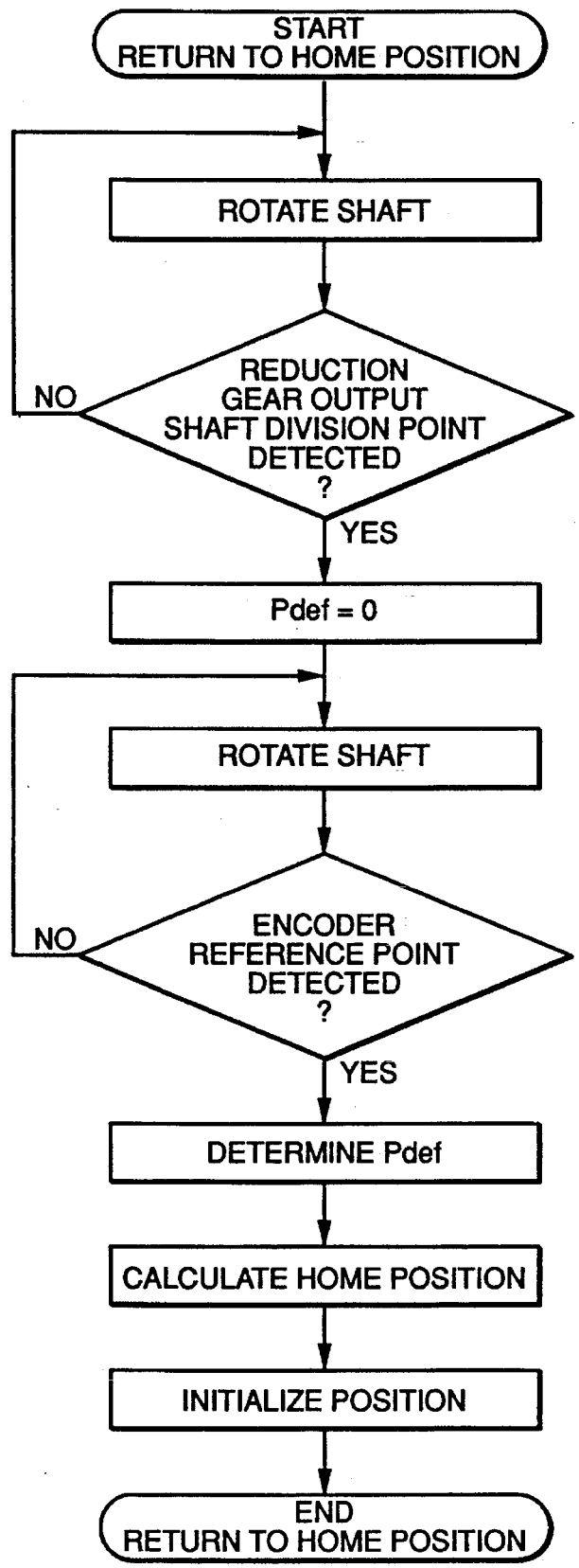
FIG._2

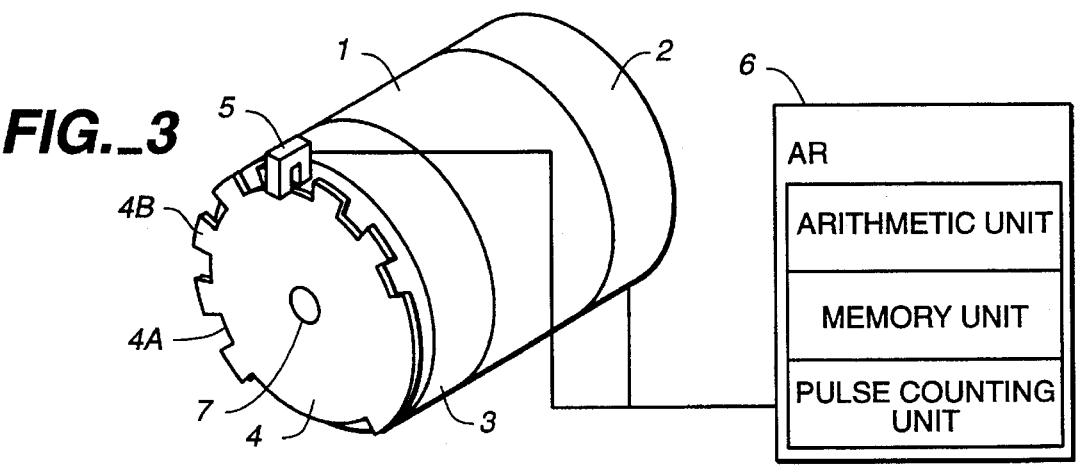
FIG._3
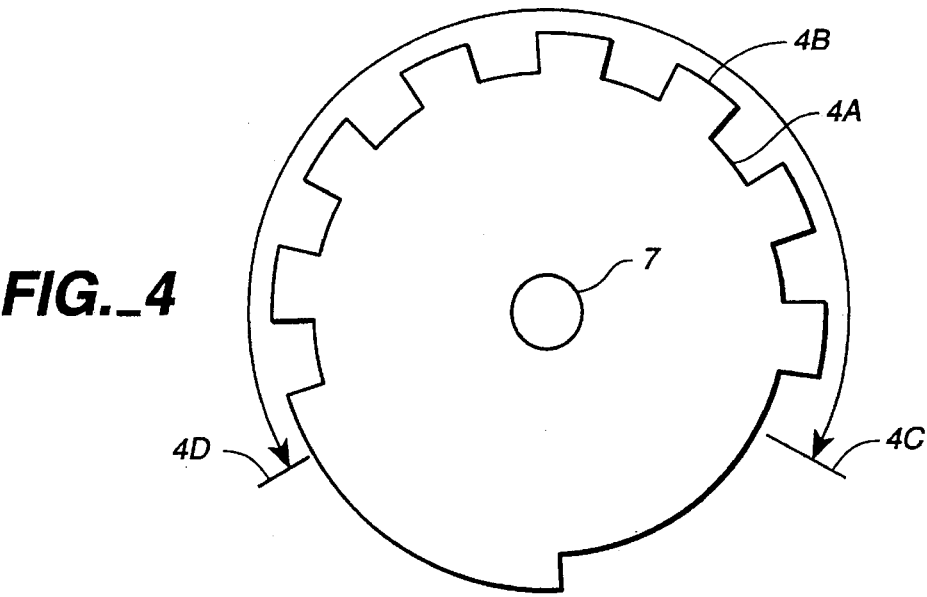
FIG._4
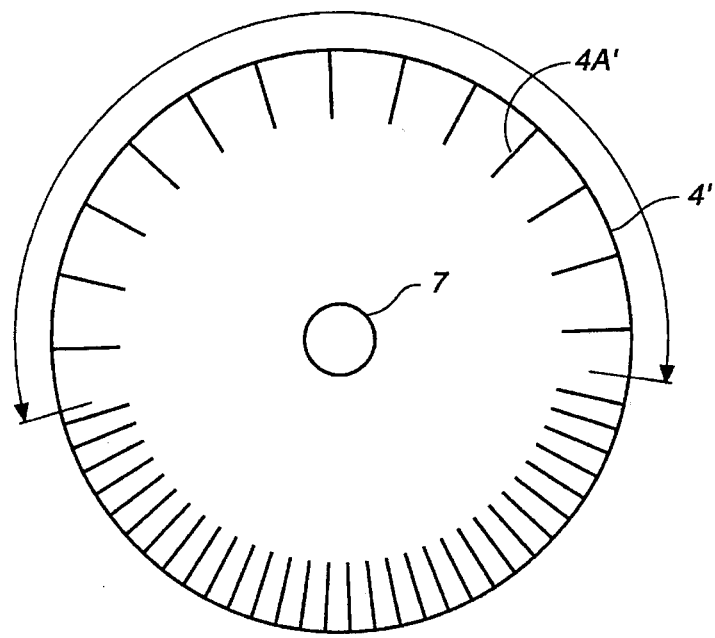
FIG._5

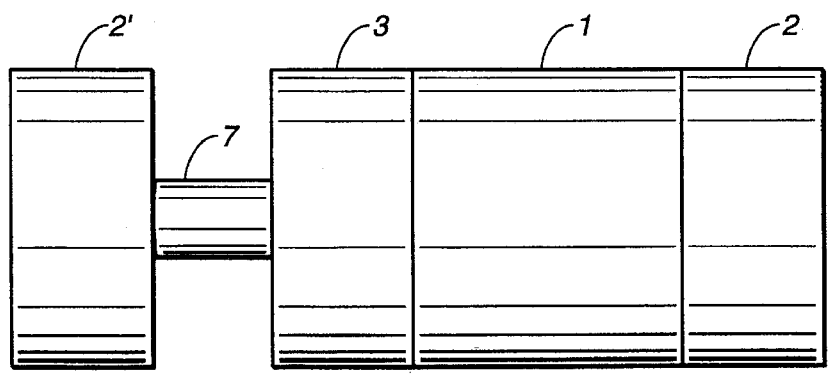
FIG._7
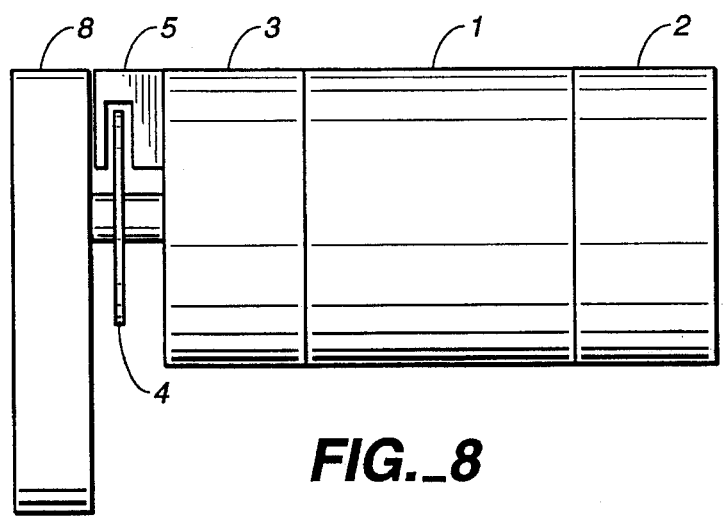
FIG._8
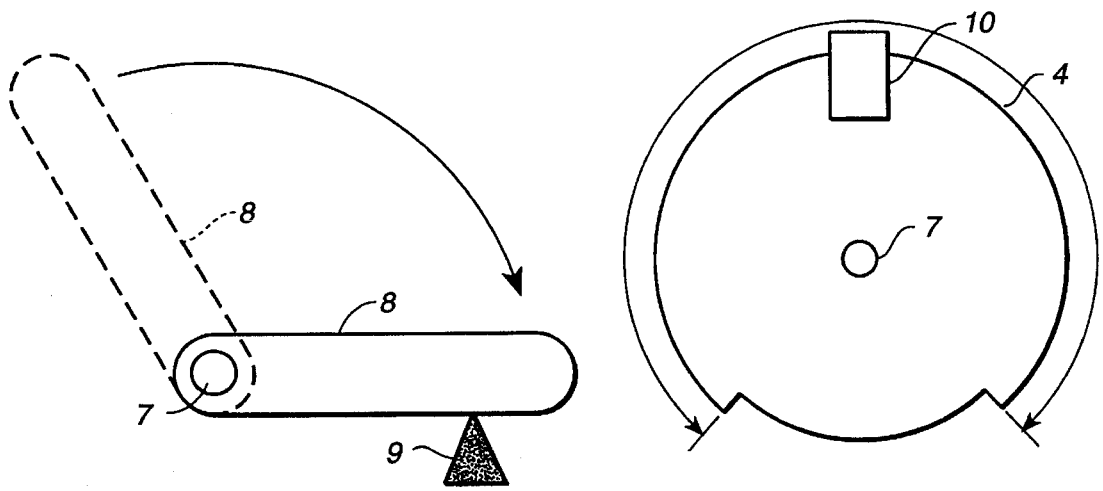
FIG._14
(PRIOR ART)
FIG._15
(PRIOR ART)

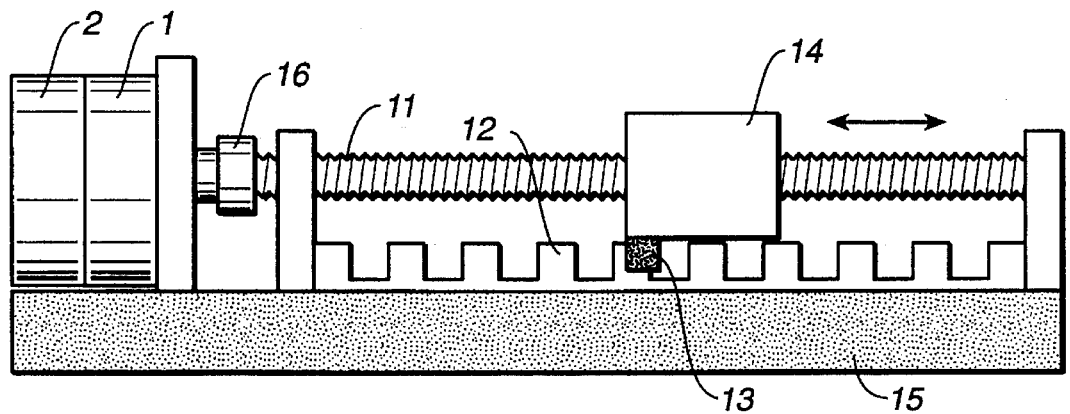
FIG._9
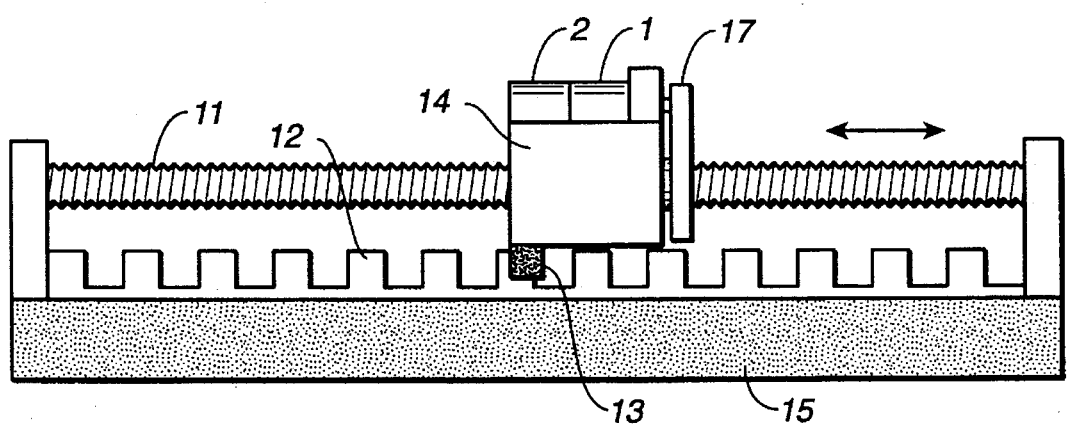
FIG._10
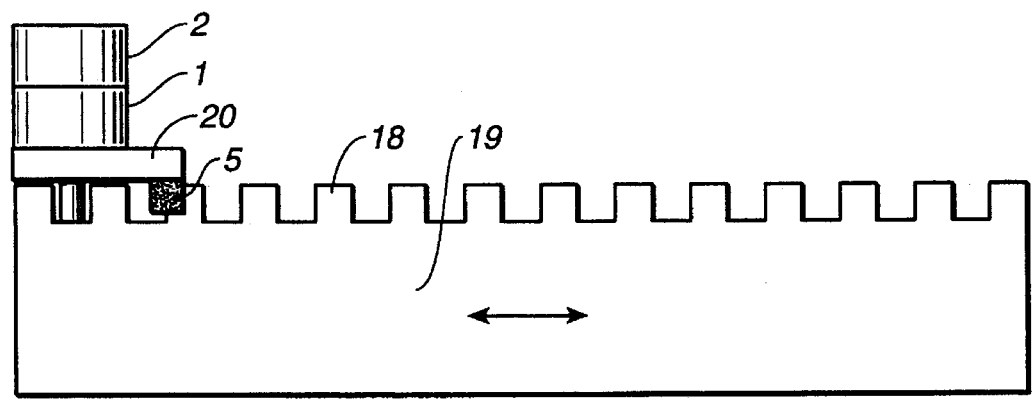
FIG._11

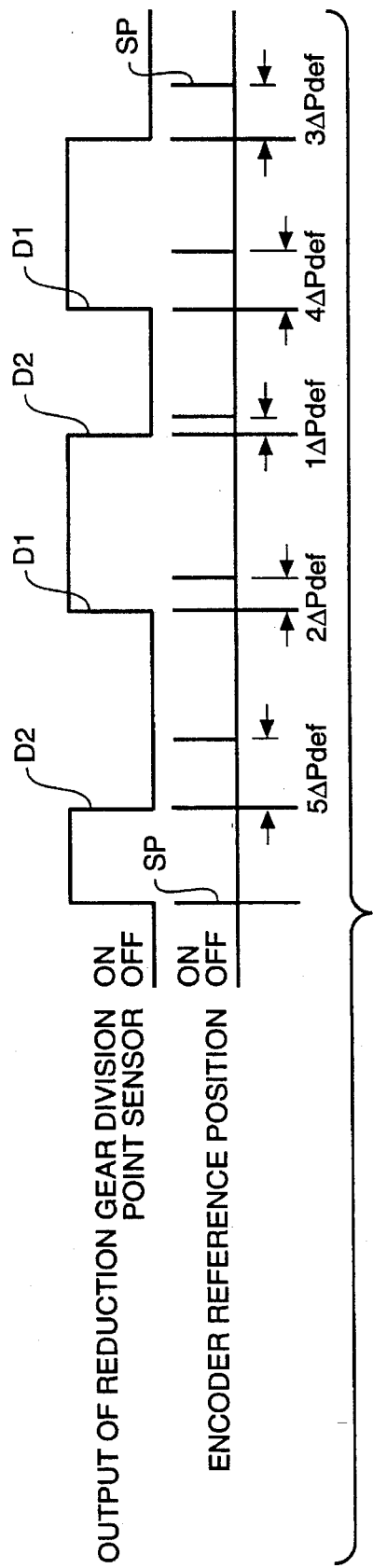
FIG._12
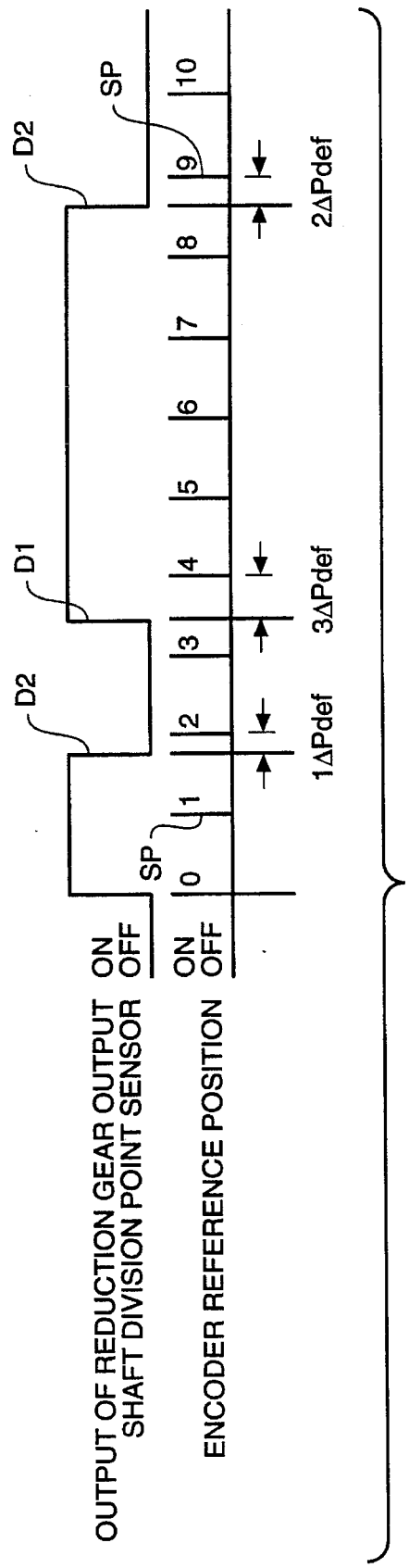
FIG._13

POSITION DETECTING METHOD AND APPARATUS

BACKGROUND OF THE INVENTION

1. Field of the Invention

The present invention relates generally to a position detecting method and a position detecting apparatus for detecting a position of a moving mechanism, using an incremental encoder coupled to the moving mechanism through a reduction gear and means for detecting division points in the moving mechanism, and more particularly, to a technique and method suitable for use in driving mechanisms for driving an arm-driven type or a stage-driven type of industrial robot.

2. Description of the Related Art

In the field of industrial robots, arm-driven type robots accompanying with rotary motion and stage-driven type robots accompanying linear motion are widely known and employed. In these types of robots, as, for example, in the arm-driven type, mechanisms accompanying rotary motion of the arm include a plurality of detecting devices are employed to detect angular position, each of which measure an absolute angle value of the output shaft of a reduction gear using, as a reference, an encoder attached at an input side of the reduction gear. In this case, in order to enable the use an inexpensive incremental encoder, it is necessary to initialize the relation between a known angle of the output shaft of the reduction gear and the corresponding output value of the incremental encoder. For this reason, as illustrated in FIG. 14, it is a common practice to perform a series of operations, known as "return-to-home position", wherein home position sensor 9 is located at a predetermined position within an operating or motion range of a robot arm 8 that is connected to output shaft 7 of the reduction gear. Arm 8 is at first moved to this position, as indicated by the arrow in FIG. 14. Then, arm 8 is moved to a position where a reference point on the incremental encoder is detected, whereby an angle of output shaft 7 is initialized to a known value. In order to provide a plurality of home positions within one turn of the output shaft, Japanese Patent Laid-Open No. 64-31209 proposes an arrangement in which an absolute encoder, in addition to an incremental encoder, is attached to the output shaft of the reduction gear to enable detection of the angle of the output shaft of the reduction gear through detection of minute angular movements of the shaft. Further, Japanese Patent Laid-Open No. 4-138503 proposes another method in which one revolution of the output shaft is divided into a plurality of different angular regions, and the ranges of the angular regions are measured with an incremental encoder so that measurement of the absolute angle value of the output shaft is accomplished.

On the other hand, in the above mentioned rotary type mechanisms, as in the case of the exemplified arm-driven mechanism shown in FIG. 14, there are cases where the rotary motion of output shaft 7 is restricted to a predetermined angular range because of a limited operating range for arm 8. In such a case, since the absolute angle of the output shaft is unknown without the initial return of arm 8 to the return-to-home position, a determination as to whether the current position of arm 8 is within the operating range or not cannot be determined based on information only from the incremental encoder. Thus, as illustrated in FIG. 15, an operating range detecting device is additionally employed to detect whether the output shaft is within the operating range. The operating range detecting device comprises a screen plate 4 which is fixed to the output shaft and has different circumferential regions corresponding to the operating range and non-operating range. An operating range detecting sensor 10, such as an optical sensor, is mounted relative to a screen plate 4 and is employed to detect the different circumferential regions of divisional points of screen plate 4 indicative of whether the detected position is within or without of the operating range. The arrow in FIG. 15 indicates the extent of the operating range so that the remaining region between the arrow heads is the non-operating range.

In case of performing return-to-home position operations in the conventional position detecting devices, mentioned above, since only one home position can be set in one revolution of the output shaft of the reduction gear, there is a problem that, depending upon the position of the output shaft at the start of the return-to-home position operation, a substantial amount of rotary motion may be necessary to move arm 8 into the home position defined by the position of the home position sensor. This necessitates long periods of time to accomplish the initialization operation of the device since a home position is required to be set for every complete rotation of the output shaft of the reduction gear. In addition, when this known technique is applied to a robot arm, there is a possibility that the arm collides with an obstacle which may exist within the range of movement of the arm.

In order to solve these problems, Japanese Patent Laid-Open No. 64-31209 and Japanese Patent Laid-Open No. 4-138503 propose methods in which a plurality of home positions are set within one revolution of the output shaft of the reduction gear. However, the method proposed in Japanese Patent Laid-Open No. 64-31209 requires an additional absolute value encoder attached to the output shaft and associated complex mechanisms which cause increased costs with decreased device reliability. On the other hand, in the method disclosed in Japanese Patent Laid-Open No. 4-138503, wherein the operation range of the output shaft is divided into different angular regions, there is a problem that, in order to increase the detection precision of an absolute angle of the reduction gear output shaft, it is necessary to correspondingly increase the detection precision of the division points, or to set a large angle between the different angular regions. In any case, it is not possible to reduce necessary manufacturing costs or to significantly reduce required rotary operations for the initialization operations.

Further, since the return-to-home position should be done within the angular operating range, at the beginning of the initialization operation, it is necessary to confirm, at the beginning of the initialization operation, that the arm is within its operating or motion range, and, if not, to first move the arm into the operating range. Therefore, it is necessary to provide another sensor, such as illustrated in FIG. 15, which correspondingly increases manufacturing costs and space requirements for the additional sensor, its means of attachment and its associated signal lines.

Furthermore, these various problems are not restricted to the above mentioned am-driven type robots employing rotary motion, but the same problems exist with linear motion positioning relative to stage-driven type robots.

The present invention is designed to solve these foregoing described problems with an objective of realizing a new position detecting apparatus and method for position detecting that reduces the required rotary motion range of the reduction gear output shaft and the linear motion range of a linear motion shaft of these detecting apparatus in achieving initialization, as compared to that conventionally employed, without increasing manufacturing costs and without sacrificing the initializing precision of the moving mechanism.

Another objective of this invention is the provision for restricting the operating or motion range of a position detecting apparatus, e.g., the rotary motion range of the reduction gear output shaft or the linear motion range of the linear motion shaft in such apparatus, and the utilization of a method for initializing the moving mechanism of the position detecting apparatus regardless of whether the home position is within the restricted operating range.

SUMMARY OF THE INVENTION

According to this invention, a position detecting apparatus has a motor driven rotary shaft connected to an incremental encoder for measuring the position of the rotary shaft and a moving mechanism connected to the motor rotary shaft through a reduction gear for detecting the position of the moving mechanism within an operating or motion range based upon output pulses from the incremental encoder. The position detecting apparatus further comprises division point detecting means for detecting a plurality of division points within the motion range of the moving mechanism. The division points may be provided on a screen plate associated with the moving mechanism. Reference point detecting means is provided for detecting reference points of the incremental encoder. The position detecting apparatus further comprises pulse counting means for counting output pulses of the incremental encoder between the time when a reference point is detected by the reference point detecting means and the time when a division point is detected by the division point detecting means during the time of movement of the moving mechanism. Also, position calculating means calculates the position of the moving mechanism by specifying the division point or a set value for each division point through comparison of the set value with the measured value by the pulse counting means wherein the division points are so provided that different set values are provided for the division points at least within a predetermined range of movement of the moving mechanism. It is preferred that the position detecting apparatus include memory means for retaining the set values and motion information with respect to positions of the moving mechanism corresponding to the set values in memory, and to obtain the position corresponding to the division point or the set value identified according to the output pulse count obtained from the pulse counting means based on the values in memory.

The division points of the screen plate may be set at a interval period the same as or different from that corresponding to the set of reference points of the incremental encoder.

The position detecting apparatus is utilized to determine an absolute position value using the position calculating means only during the time of initialization of the position of the moving mechanism and to accumulate measured output pulses of the incremental encoder after initialization to determine the position of the moving mechanism. The position calculating means preferably comprises means for specifying the division point or the set count value corresponding to the division point through comparison of the set count value with the counted value and initialization means for initializing the value of the position detected by the incremental encoder by setting the value to correspond with the specified division point or set count value.

The division point detecting means is provided for detection of signal transients between a plurality of binary (ON/ OFF or OFF/ON) states with the division points functioning as a state boundary, and includes means for identifying the transition direction of the detection signal while the position detecting means is arranged to identify the division point or the set value based on the count value and the identified transient direction.

There are situations where the motion range of the moving mechanism is restricted so that a plurality of division points are set within the restricted motion range. In this case, it is desirable that the position detecting apparatus include range detecting means for detecting whether the moving mechanism is within the motion range, with movement of the moving mechanism arranged to be within the motion range if the instant position of the moving mechanism is outside of the motion range.

It is desirable that the position detecting apparatus comprise range detecting means for detecting whether the moving mechanism is within the motion range as well as means for measuring detection intervals which differ according to whether the detected position is inside or outside of the motion range. Further, it is desirable that the position detecting apparatus provide output from the division point detecting sensor comprising a first condition indicative of one end of the motion range and a second condition indicative of the other end of the motion range so that if the output from the division point detecting sensor is indicative of the first condition, the moving mechanism is moved toward the other end of the motion range for detection of output pulses, and if the output from the division point detecting sensor is indicative of the second condition, the moving mechanism is moved toward the one end of the motion range for detection of output pulses.

In another aspect of this invention, a position detecting method provides for determination of the position of the moving mechanism using an incremental encoder coupled to the moving mechanism through a reduction gear, comprising the steps of initially determining the positional relation between the division points on the moving mechanism and the reference points on the incremental encoder, counting the output pulses from the incremental encoder between the time when each of a plurality of division points are detected relative to the time when a reference point on the incremental encoder is detected, specifying the division point corresponding to the count value of the pulses based upon the positional relation of the detected moving mechanism and incremental encoder pulses, and calculating the position of the moving mechanism corresponding to the specified division point. It is preferred to set the relation between the number of the output pulses of the encoder and the position of each division point of the moving mechanism to have a 1:1 correspondence. In addition, it is preferred to detect a plurality of division points that are adjacent each other among a plurality division points on the moving mechanism to obtain a series of detection signals that are different from one another, the plurality of division points corresponding to a different number of output pulses.

The moving mechanism may be comprised of a rotary shaft wherein the position to be detected is the amount of rotation of the shaft determined by the angle of shaft rotation. Alternatively, the moving mechanism may be a linear motion shaft wherein the position to be detected is the amount of distance or travel of the linear motion shaft.

According to a first aspect of the position detecting apparatus of this invention, initialization is performed by having the pulse counting means measure the output pulses from the incremental encoder, upon movement of the moving mechanism, by means of the spatial intervals of the equally spaced division points of the moving mechanism, connected to the reduction gear, at least through one revolution of the encoder shaft. In this case, the amount of movement of the moving mechanism required for initialization is less than that conventionally required without sacrificing detection precision.

A second aspect of the position detecting apparatus of this invention comprises memory means for storing the preset values presenting initial encoder pulse count values and information relative to the position of the moving mechanism in relation to these values, and its position is determined based on the counted output pulses of the incremental encoder relative to the values stored in the memory. As a result, no complicated arithmetic processing is necessary.

A third aspect of the position detecting apparatus of this invention, the division points are set at equal intervals or with a constant periods which are different from the periods of the reference points of the incremental encoder. Hence, the apparatus can easily determine the position of the moving mechanism only through determining or retention of parameters relating to the relation between the period of the division points and the period of the reference points.

A fourth aspect of the position detecting apparatus of this invention is the capability of fast initialization of the position of the moving mechanism achieved through a small amount of motion of the moving mechanism.

A fifth aspect of the position detecting apparatus of this invention is based on the specified division points or the set count values wherein the detected position value produced by the incremental encoder is set to correspond to the specified division point or set value. Since position determination can be accurately accomplished with the detection precision or resolution of the incremental encoder, regardless of the precision of detection of the division points, precision of initialization is enhanced and the cost of the division point detecting means is decreased in not requiring a screen plate having extremely accurate positioning of its division points.

A sixth aspect of the position detecting apparatus of this invention relates to the employment of the transient (ON/OFF or OFF/ON) state of the division point detection signal so that the detection signal is used both for indicating information about the occurrence of the division point and the direction of motion based upon transient state. Therefore, the degree of freedom for determining the division point or the set value is increased. Thus, the target division point can be specified through reduced amount of information relative to the observed division point and its transient state.

A seventh aspect of the position detecting apparatus of this invention relates to the restriction of the motion range of the moving mechanism and the setting of the division points within the restricted motion range.

An eighth aspect of the position detecting apparatus of this invention provides for concurrent operation of the movement into the operating range and initialization due to the range detecting means and for rotation of the moving mechanism to within the motion range if the moving mechanism is outside of the motion range.

A ninth aspect of the position detecting apparatus of this invention is the lack of requiring any additional sensor for indicating whether the position detected is within or outside of the motion range because the range detecting means serves as means for measuring the detection intervals of the division points of the moving mechanism which are of different periods depending on whether the detected position is inside or outside of the motion range. As a result, the necessity of providing for a mounting position to accommodate an additional sensor is eliminated so that the occurrence of additional cost and manufacturing considerations for such an accommodation are unnecessary.

A tenth aspect of the position detecting apparatus of this invention is the provision of the moving mechanism for movement toward the central portion of the motion range when the moving mechanism is at or near either end of the motion range, and for detection of a division point within the motion range, i.e., when the moving mechanism is within the middle portion of the motion range between the motion range ends. Therefore, the moving mechanism can be controlled to remain within the motion range when the moving mechanism is first moved for initialization.

In a first aspect of the method of position detecting of this invention, the amount of movement of the moving mechanism for initialization is reduced, compared to that required for conventional position detecting apparatus, with a corresponding shortened initialization time and without sacrificing detection precision.

In a second aspect of the method of position detecting of this invention, position detection is based accurately on the obtained output pulse count of the moving mechanism with the relation between the output pulse count and the division point detection having a 1:1 correspondence.

In a third aspect of the method of position detecting of this invention, different groups of a series of adjacently disposed division points on a screen plate provide for respectively different detection signals, and a different number of pulses results for the different division point groups. Hence, a particular group of division points can be determined based on the counted number of output pulses from a division point sensor, and each of the individual division points in a specific group can be detected for position determination based on the detection signals. Therefore, the tolerance of the division point detection error can be minimized without increasing the amount of required initialization movement, or the amount of initialization movement can be reduced while minimizing the tolerance of the division point detection error.

Other objects and attainments together with a fuller understanding of the invention will become apparent and appreciated by referring to the following description and claims taken in conjunction with the accompanying drawings.

BRIEF DESCRIPTION OF THE DRAWINGS

FIG. 1 is a timing chart for explaining a first embodiment of a position detecting method of this invention.

FIG. 2 is a flowchart for explaining the method of position detection utilized in connection, for example, with the first embodiment.

FIG. 3 is a perspective view of a position detection apparatus for implementing the position detecting method of the first embodiment.

FIG. 4 is a schematic illustration of an example of a geometry for a screen plate employed in the apparatus shown in FIG. 3.

FIG. 5 is an schematic illustration of an example of another geometry for a screen plate according to the first embodiment.

FIG. 6 is a timing chart for explaining a method employing virtual reference points on an incremental encoder in connection with a modified form of the first embodiment.

FIG. 7 is a schematic view of a position detection apparatus employing an incremental encoder as a means for division point detecting in connection with a modified form of the first embodiment.

FIG. 8 is a schematic side view of a position detection apparatus relative to the first embodiment as applied to a driving mechanism for a robot arm.

FIG. 9 is a schematic side view of a position detection apparatus relative to the first embodiment as applied to a driving mechanism comprising a linear screw rotation type of robot stage.

FIG. 10 is a schematic side view of a position detection apparatus relative to the first embodiment as applied to a driving mechanism comprising a nut rotation type of robot stage.

FIG. 11 is a schematic side view of a position detection apparatus relative to the first embodiment as applied to a driving mechanism comprising a moving belt type of robot stage.

FIG. 12 is a timing chart for explaining a second embodiment of this invention.

FIG. 13 is a timing chart for explaining a modified form of the second embodiment.

FIG. 14 is a schematic illustration for explaining a method employed in a conventional home position detecting method.

FIG. 15 a schematic illustration for explaining the operating range of a conventional position detecting method used in conventional position detection apparatus.

DESCRIPTION OF THE PREFERRED EMBODIMENTS

The several embodiments of a position detecting method and a position detecting apparatus according to this invention will now be described with reference to the foregoing, briefly described figures.

[First Embodiment]

The first embodiment relates to a fundamental structure comprising an input shaft, or a first rotation shaft, which is connected to a motor. The input shaft is connected to an output shaft, or a second rotation shaft, via a reduction gear connected to the motor input shaft. Thus, input rotary motion is translated through the reduction gear assembly to provide rotary motion at the output shaft. While the present invention is explained relative to position detecting apparatus of this nature, the principle of the method of this invention can also be applied to any situation requiring measurement of motion, such as, the amount of movement, e.g., angular rotation distance and linear movement distance, of a moving mechanism, such as a rotation shaft and linear motion shaft, via an incremental encoder connected to the moving mechanism through a reduction gear, as well as to detect a given position, such as an angular position or a linear position.

The above described embodiment is shown in detail in FIG. 3. Incremental encoder 2 is connected to an end of a drive shaft (not seen) of motor 1. Reduction gear 3 is connected to the other end of the motor drive shaft. Screen plate 4 is attached to an output shaft 7 of reduction gear 3. A transmission type photosensor 5 is positioned astride of the periphery of screen 4 and its light output is intersected by rotational passage of alternating concave portions 4A and convex portions 4B that are formed along the outer circumference of screen plate 4. Portions 4A, 4B of screen plate 4 are formed at identical angular intervals along a periphery portion of the plate within the working or operative motion range of output shaft 7. Transitions between the concave and the convex portions define division points of the rotary motion range of the output shaft. Upon rotation of the output shaft and corresponding rotation of the screen plate, the convex and concave portions alternately pass through the photosensor 5 resulting in a binary output signal from photosensor 5 as will be appreciated by those of ordinary skill in the art. Thus, photosensor 5 serves as a division point sensor, i.e., the edges in the ON/OFF waveform produced at the photosensor represent the division points.

An output from incremental encoder 2 is connected to controller 6. Controller 6 comprises an arithmetic unit, such as a central processing unit or the like, a memory unit composed of several different types of memories, and a pulse counting unit that is composed of a counter circuit or the like. Controller 6 performs operations of the return-to-home position and angle measurement of output shaft 7 in an angle detecting apparatus having the above described structure of FIG. 3. The arithmetic unit performs arithmetic processing for calculating the angle of output shaft 7. The memory unit stores the value representing the relation between the pulse count from incremental encoder 2 and the angle of output shaft 7. The pulse counting unit counts the output pulses from incremental encoder 2.

The principle of return-to-home position is utilized in this embodiment and the operation is explained in reference to FIGS. 1 and 2. FIG. 1 shows the relationship between encoder reference positions, represented by a pulse signal, SP, and the division points of the output shaft motion range, represented by the output from the photosensor. The encoder output is a pulse signal, SP, comprising a plurality of reference points set by the incremental encoder that is connected to the motor input shaft, whereas the output derived from photosensor 5 on the output shaft, which is connected to the input shaft through the reduction gear having a predetermined reduction ratio, is shown at D1, D2. Generally, in the case here, one reference point is set for every predetermined angular position of the encoder shaft of incremental encoder 2, such that, for example, one reference pulse signal, SP, per revolution of the encoder shaft is provided as output from the incremental encoder.

The above described pulse counting unit obtains an output pulse count, Pdef, i.e., the number of output pulses from the incremental encoder counted from each of the edges D1, D2 in the output waveform from the division point sensor to the detection of the next reference pulse signal, SP, from incremental encoder 2. This embodiment is set up so that the period of the encoder's reference point positions is different from the period of the division point positions. Therefore, as shown in FIG. 1, the output pulse count Pdef increases by Δpdef every two revolutions of encoder shaft. Since, in this particular embodiment, the output pulse count, Pdef, is obtained in relation to a particular division point differs from that obtained in relation to other division points, a one-to-one relationship between the absolute output angles, θout, of the output shaft and the output pulse counts, Pdef, is established. When this relationship is obtained beforehand, this embodiment can obtain the absolute angle of the output shaft from each output pulse count.

FIG. 2 is a flowchart showing the operational procedure for the return-to-home position. In this procedure, the drive shaft and the output shaft are rotated through operation of motor 1. When a division point position is detected on the output shaft, the output pulse count, Pdef, is reset to zero. Next, the output shaft is further rotated so that, if a reference point of incremental encoder 2 is detected, the output pulse count, Pdef, is then read out. The operation of the return-to-home position is completed by obtaining the absolute angle value of the output shaft from this read out value which is the positional relation between the division points and the reference points previously determined.

By setting the period of the division points, i.e., the angle between each two successive division points at a proper value different from the rotational angle by which the output shaft is turned in response to two revolutions of the input shaft (and incremental encoder 2), it is possible to change the positional relation between each division point of the output shaft motion and the next following reference point of the incremental encoder. This change is detected via the output pulse count from the incremental encoder 2, and the angle of the output shaft is obtained through specifying which division point among the plurality of division points is measured from the initialized position.

The foregoing described principle of operation of the position detecting apparatus will now be described in detail. As described above, since the output pulse count, Pdef, of the incremental encoder from detecting a division point to detecting the next reference point changes by interval steps, ΔPdef, according to the position of the division point, it is possible to obtain the output angle, θout, by initially obtaining the relation between the output pulse count, Pdef, and the output angle, θout, of the output shaft and by means of the output pulse count, Pdef.

If the measurement error is less than ±ΔPdef/2, it is possible to distinguish among the division points on the output shaft of the reduction gear from each other. This incremental amount, ΔPdef, is determined by the equally divided angular regions of the output shaft because the reference point interval is determined. Hence, the angle of the equally divided angular regions of the output shaft is properly selected according to the detection precision of the sensor. Therefore, it is not necessary for the division point sensor to be manufactured with high precision compared to the resolution of the incremental encoder so that this type of position detecting apparatus is not a complicated structure and its manufacturing costs can be reduced by using a less expensive type of moving mechanism.

Although the concave and convex portions of screen 4 in FIG. 4 have the same length in the circumferential direction, i.e., the same angular intervals, it is possible, as illustrated in FIG. 5, to use screen plate 4' having a plurality of equally spaced slits 4A'. In addition, although the transmission type photosensor 5 is used as the division point sensor for detecting the division point of the rotational angle, it is also possible to use a reflection type of photosensor or a magnetic sensor.

Next, employing this invention, an example of a concrete calculation method for obtaining the absolute angle of the output shaft of the reduction gear will be described. At first, the mathematical parameters, comprising variables and constants, are defined as follows:

[Definition]
Penc: Resolution of the incremental encoder [Number of output pulses from the encoder per revolution]
θdiv: Angle between successive division points of the output shaft of the reduction gear [rad]
θout: Absolute angle of the output shaft [rad]
1/R: Reduction ratio of the reduction gear
k: Divisional number of the encoder shaft
m: Interval of home positions [rotations]
θabs: Absolute angle of the encoder shaft [rad]
Pabs: Total pulse count of the encoder shaft [pulses]
θdef: Rotational angle of the encoder shaft between a division point on the output shaft and the next reference point of the encoder [rad]
Pdef: Output pulse count of the encoder between a division point on the output shaft and the next reference point of the encoder [pulses]
Δθdef: Change in θdef[rad] (equals 2 π/k)
ΔPdef: Change in Pdef[pulses] (equals Penc/k)

The relation between the divisional angle, θdiv, and the set values k and m is given by the following expression:

$$\theta div = (2\pi \times m - 2\pi/k)/R \quad (1)$$

This relation represents a set up where the angle of the output shaft is detected every m revolutions of the encoder shaft so that, if the output shaft rotates by the divisional angle, θdiv, the rotation angle, θdef, of the encoder shaft between a division point on the output shaft and the next reference points of the encoder changes at the interval or step, Δθdef=2π/k. As a result, different k positions of the output shaft can be distinguished.

Employing the measured output pulse count, Pdef, of the encoder between a division point of the output shaft and the next reference point of the encoder, the angle of the output shaft, θout, is achieved by steps (a)–(f) set forth below.

CALCULATION EXAMPLE 1

[Definition]
n = INT[(Pdef−Pofs)/(Penc/k)]     (2)
(INT: Rounding for integer calculation)
Pofs = Pdef % (Penc/k)     (3)
(%: Remainder calculation)
Pbas: Pabs at n = 0
Prmin: Minimum pulse count in the operating range
Prmax: Maximum pulse count in the operating range
[Calculation procedure for θout]
(a) Initially obtain Pofs and Pbas.
(b) Perform the return-to-home position, and measure Pdef.
(c) Calculate n = INT[(Pdef − Pofs)/(Penc/k)].
(d) Calculate:
Pabs1 = SIGN × Penc × m × n + Pbas ;     (4)
Pabs2 = SIGN × Penc × m × (n − k) + Pbas     (5)
(SIGN: 1 in case the direction of the return-to-home position is plus, and −1 in case the direction of the return-to-home position is minus).
(e) Select one between Pabs1 and Pabs2, which is within the detection region, as Pabs.
If Prmin ≦ Pabs1 ≦ Prmax, then Pabs = Pabs1.     (6)
If Prmin ≦ Pabs2 ≦ Prmax, then Pabs = Pabs2.     (7)
(f) Calculate:
θout = [Pabs/(Penc × R)] × 2π.     (8)

The value, Pofs, represents an offset between the division points of the output shaft and the reference points of the encoder, and is the minimum value of the output pulse count, Pdef. The variable, n, is the number of a respective division point with the division point yielding the minimum value of the output pulse count, Pdef, being defined to have the number, n=0. The variable, Pbas, is the absolute value of the output pulse count from incremental encoder 2 at n=0, i.e., the reference point giving the minimum value of the output pulse count, Pdef, and is also the pulse count that is counted with the encoder on the basis of the home position of the output shaft.

Step (a) initally obtains and saves the constant, Pofs, by means of the below described method. From Pofs and the output pulse count, Pdef, measured in step (b), the calculation of the value for n is determined at step (c), i.e., the sequence number of the division point. Using this value of n, at step (d), the encoder pulse counts, Pabs1 and Pabs2, of the encoder corresponding to the absolute angles of the output shaft in both directions of the return-to-home-position. At step (e), one of these values, Pabs1 and Pabs2, is selected that is within the detection region of the pulse count corresponding to the operating or motion range. The detection region of the pulse count corresponding to the operating range of the output shaft, is defined by Prmin and Prmax which have been obtained and saved before. The selected value is taken as the encoder pulse count, Pabs, which corresponds to the absolute angle of the output shaft. At step (f), this value of Pabs is converted to output angle, θout.

Next, steps (a) and (b) of the above procedure to obtain the parameters Pofs and Pbas, employed for calculating the output angle, θout, are described.

[Method of Obtaining Pofs and Pbas]
(a) Set Pabs through calibrating the angle of the output shaft in the reduction gear.
(b) Obtain Pdef through performing the return-to-home-position.
(c) Calculate Pofs=Pdef % (Penc/k).
(d) Calculate n=INT[(Pdef-Pofs)/(Penc/k)].
(e) Calculate:

$$Pbas1 = Pabs - SIGN \times Penc \times m \times n; \quad (9)$$

$$Pbas2 = Pabs - SIGN \times Penc \times m \times (n-k). \quad (10)$$

(f) Select one between Pbas1 and Pbas2, which is within the detection region, as the value for Pbas as follows:

$$\text{If } Prmin \leq Pbas1 \leq Prmax, \text{ then } Pbas = Pbas1. \quad (11)$$

$$\text{If } Prmin \leq Pbas2 \leq Prmax, \text{ then } Pbas = Pbas2. \quad (12)$$

In above procedure, at step (a), this embodiment sets the angle of the output shaft and the pulse count of the encoder as a predetermined relation, and obtains the pulse count, Pabs, of the encoder at plural home positions of the output shaft. At step (b), the output pulse count, Pdef, is measured through rotation of the output shaft. At step (c), the value for Pofs is obtained by performing the remainder calculation. Next, at step (d), the value of n is obtained in the same way as described previously. Then, the difference between the pulse count, corresponding to the value of n and the value of Pabs, the values for Pbas1 and Pbas2 are calculated, via step (e), for both return directions. Finally, at step (f), one values of Pbas1 and Pbas2 is selected as the value for Pbas that is within the detection region corresponding to the operating or motion range of the output shaft.

In the foregoing example of calculation, expression (1) is employed for the relation between θdiv, m and k. However, if $$\theta div = (2\pi \times m + 2\pi/k)/R \quad (13)$$

is employed, the angle of the output shaft can be obtained with the foregoing expressions (a)–(f) in a manner similar to expression (1), although the size relation between the interval of the division points of the output shaft and the interval of the reference points of the encoder is reversed.

CALCULATION EXAMPLE 2

Although calculation example 1 provides for the parameters Pofs and Pbas for angle calculations on the basis of the position where a reference point of the incremental encoder comes the closest to a division point of the output shaft, there is no reason to always calculate on the basis of this position. As shown in FIG. 6, calculation example 2 defines (a) the difference between a reference point of the incremental encoder and the detected position of the division point as Pofsi=n×ΔPdef+Pofs, (b) sets a virtual reference position of the incremental encoder by using this parameter instead of Pofs, employed in calculation example 1, and (c) can perform the necessary calculation, similar to calculation example 1, by employing the position, Pbasi, where a division point of the output shaft and the virtual reference point of the incremental encoder correspond to each other, instead of Pbas.

CALCULATION EXAMPLE 3

The calculation examples 1 and 2 obtained the output angle, θout, through determination of two parameters, Pofs and Pbas, or, Pofsi and Pbasi, respectively, which expresses the relation between the output pulse count, Pdef, of the incremental encoder from the detected position of the division point of the output shaft to detection of the reference point of the incremental encoder and the angle, θout, of the reduction gear output shaft, respectively. However, if values representing informational content substantially similar to these above described parameters can be derived, similar to the calculations of these parameters, calculations similar to the above ones can be achieved by using a further method of calculation example 3. This calculation example 3 stores the relation between the output pulse count, Pdef, and the output angle, θout, of the output shaft at every position as a data table, and the angle, θout, can be derived from the detected pulse count, Pdef, by referencing the data table. Since, due to measurement errors including mechanical error, the measured pulse count, Pdef, does not always equal one of the values of Pdef stored in the data table, this calculation example selects the nearest stored value, if any, that is within a predetermined allowable error range and thereby obtains the output angle, θout, of the output shaft.

Table 1 shows a numerical example in the case where the reduction ratio of the reduction gear is 1/R=1/50, the resolution of the encoder is Penc=8192 pulses per revolution, the divisional number of the encoder is k=18, and the interval of the home positions is m=2. In Table 1, the reference interval of the value of the output pulse count Pdef is Δpdef=450 [pulses]. If the measured output pulse count, Pdef, is approximate to the value in the table, which value is hereinafter referred to as "Pdeft", the corresponding relation in Table 1 is applied as the count, Pdeft, for the detected value. Thus, if $$Pdeft - \Delta\epsilon < Pdef < Pdeft + \Delta\epsilon, \quad (14)$$

then, Table 1 can be applied, employing the count value, Pdeft, from the table instead of Pdef. Here, 2Δε<Δpdef=450 [pulses]. In the case where the above expression (14) is not established with any of the values, Pdef, in Table 1, the detected value is adjudged to be an error and it is necessary to perform the process again to determine the detected value.

TABLE 1

| Pdeft | n | Pabs | Calculation of Pabs |
|---|---|---|---|
| 4068 | 10 | −130072 | 8192 × 2 × (10 − 18) ÷ 1000 |
| 5043 | 11 | −113688 | 8192 × 2 × (11 − 18) ÷ 1000 |
| 5518 | 12 | −93704 | 8192 × 2 × (12 − 18) ÷ 1000 |
| 5973 | 13 | −80920 | 8192 × 2 × (13 − 18) ÷ 1000 |
| 6429 | 14 | −64536 | 8192 × 2 × (14 − 18) ÷ 1000 |
| 6884 | 15 | −48152 | 8192 × 2 × (15 − 18) ÷ 1000 |
| 7339 | 16 | −31768 | 8192 × 2 × (16 − 18) ÷ 1000 |
| 7794 | 17 | −15384 | 8192 × 2 × (17 − 18) ÷ 1000 |
| 57 | 0 | 1000 | 8192 × 2 × 0 ÷ 1000 |

TABLE 1-continued

| Pdeft | n | Pabs | Calculation of Pabs |
|---|---|---|---|
| 512 | 1 | 17384 | 8192 × 2 × 1 ÷ 1000 |
| 967 | 2 | 33768 | 8192 × 2 × 2 ÷ 1000 |
| 1422 | 3 | 50152 | 8192 × 2 × 3 ÷ 1000 |
| 1877 | 4 | 66536 | 8192 × 2 × 4 ÷ 1000 |
| 2333 | 5 | 82920 | 8192 × 2 × 5 ÷ 1000 |
| 2788 | 6 | 99304 | 8192 × 2 × 6 ÷ 1000 |
| 3243 | 7 | 115688 | 8192 × 2 × 7 ÷ 1000 |
| 3698 | 8 | 132072 | 8192 × 2 × 8 ÷ 1000 |
| 4153 | 9 | 148456 | 8192 × 2 × 9 ÷ 1000 |

As an implementation issue, if the position detecting apparatus is designed so that the rotary direction for achieving the output shaft angle of the reduction gear is not restricted to one particular direction, i.e., it is bi-directional, then, it is possible to perform initialization without going outside of the operating range even if a robot arm exists at the end of the operating range of the output shaft, and even if there is a possibility that an obstacle may exist in the operating range of the robot arm. It is possible to perform initialization while avoiding the obstacle so that bi-directional operation is convenient for this particular situation. There are two conditions in this situation detectable due to different rotary directions when using a screen plate 4 having detectable positions. These two conditions that depend upon rotational direction are at realized at the sensor output, and are signal transitions from ON state to OFF state and from OFF state to ON state. In general, the sensor detecting position has a hysteresis characteristic expressing different values according to the transition state. For this reason, where the relation between Pdef and θout (represented by the above described parameters, Pofs and Pbas, or, Pofsi and Pbasi or the data table) is obtained relative to a specific rotational direction, if the output angle is obtained while moving in a direction opposite to the specific rotational direction, and a detection error of the value of Pdef occurs due to the above mentioned hysteresis. This hysteresis induced error increases the danger of an error in the angle of the output shaft. As a counter-measure, it is possible to prepare different parameters, or different data tables relative to each direction of movement, and to use the parameters, or data table having been previously obtained for the same direction as the direction of movement employed for detection of the output pulse count. Even if the processing is performed with the parameters or data table obtained in a specific direction of movement, it is possible to compensate for the hysteresis error by adding a correction value that has been previously obtained to the measured output pulse or the calculated angle of the output shaft where the initialization has been performed by first moving in the direction opposite to the specific direction of movement.

The above division point sensor detecting approach is designed to indicate the division points due to the transition change, relative to the division point on the screen plate, from an ON state to an OFF state or from an OFF state to an ON state when the output shaft is in rotational motion. In this connection, the previously described calculation examples do not take into account any information based upon a change in the transition state of the sensor output relative to a rotational passage of a division point on the screen plate. Using this kind of information (i.e., whether the screen plate transition is from a convex portion to a concave portion so that the sensor output goes from an ON state to an OFF state, or a transition from a concave portion to a convex portion so that the sensor output goes from an OFF state to an ON state), it is not necessary to distinguish between adjacent division points by means of the output pulse count. It is only necessary to distinguish those division points from each other where the state changes of the sensor output are the same. Thus, the allowable error, $\Delta\epsilon$, in the detection of the output pulse count, Pdef, is extended from less than $\pm\Delta Pdef/2$ to less than $\pm\Delta Pdef$. As a result, reliability of the angle detection can be increased without the necessity for increasing the amount of rotational movement necessary to achieve initialization. To the contrary, the amount of rotational movement necessary for initialization can be reduced while maintaining reliability in detecting the resultant output angle.

In the case of information bearing on the change of state of the sensor output is used, through the preparation of the two different (two) parameter sets, Pofs and Pbas, or, Pofsi and Pbasi, or data tables corresponding to the change of states of the sensor output, it is possible to use these parameters or the table data for determination of each state change of the sensor output. In addition, in the case where these parameters or the data table for a particular state change are employed and the actual change of state of the sensor output is different from that derived from the parameters or table data, it is possible to perform a correction by adding a correction value to the output pulse count or the calculated output shaft angle. In the case where the information on the change of state of the sensor output is employed, it is only necessary that the positions where the change of states of the sensor output are mutually equal are equidistant. Hence, it is not always necessary to render the angle the same where the sensor output is ON and the angle where the sensor output is OFF, as previously described. Therefore, this method is effective as a counter measure in the problem that, due to a particular manufacturing technique, it is difficult to manufacture concave portions and he convex portions of screen plate 4 so as to be the same size.

In a situation where there is a requirement to restrict the motion range for obtaining the angle of the output shaft within the operating or motion range, it is necessary to take consider a different approach. An example of this approach is shown relative to the screen plate in FIG. 4 wherein plate 4 has one end portion at 4C at one end of the operating range of screen plate 4, which ends as a concave portion, the other end portion at 4D at the other end of the operating range of screen plate 4, which ends as a convex portion. In the case where the rotational direction is in a counterclockwise direction, the sensor position is at concave end portion 4C of screen plate 4 so that the sensor output is in an OFF state. In the case where the rotational direction is in a clockwise direction, the sensor position is at convex end portion 4D of screen plate 4 so that the sensor output is in an ON state. In this manner, since counterclockwise motion is the case for the return position at end portion 4C of the operating range and clockwise motion is the case for the return position at end portion 4C of the operating range, the division points are always within the operating range between both end portions 4C, 4D and movement of the output shaft can be maintained within the operating range after initialization to detect the initial passage of a division point as viewed by the sensor. Since this method can be realized by only including the information derived as to the direction of motion of screen plate 4 to obtain the output shaft angle of the reduction gear, there is no necessity to consider the employment of an additional sensor. Thus, the manufacturing cost is not unnecessarily increased, and there is no need to consider additional area and space for mounting such an additional sensor.

In the situation where the operating or motion range is restricted, such as in the case of a robot arm, particularly from a viewpoint of safety, there should be immediate detection of any movement outside of the operating range and terminate robot arm operation. For this reason, the portion that is outside the operating range of screen plates 4 or 4' is divided into angular divisions or positions different from those existing within the operating range, as illustrated in FIGS. 4 and 5. The divided angular divisions are monitored through detecting the output pulse count from the incremental encoder and detected intervals of the division points making it is possible to distinguish between movement in the region outside the operating range versus movement in the region inside the operating range. Since this method also can be realized through the addition of information indicative of area outside of the operating range of the screen plate, there is no necessity or need to consider the employment of an additional sensor. Thus, the manufacturing cost is not unnecessarily increased, and there is no need to consider additional area and space for mounting such an additional sensor.

FIG. 7 illustrates a modified form of the position detecting apparatus wherein incremental encoder 2' is employed instead of photosensor 5 as a means for detecting the equally positioned division points on output shaft 7 of reduction gear 3. Since the precision of angular computation relative to output shaft 7 of the reduction gear can be increased through direct connection to incremental encoder 2' at the outer end of output shaft 7 employing this encoder as a division point detecting sensor, it is possible to increase the number of division points relative to rotation of the output shaft as well as decrease the amount of movement necessary for initialization in achieving the output angle.

FIG. 8 illustrates the application of the position detecting apparatus of this embodiment as applied to a robot arm 8. Screen plate 4 and photosensor 5 provide the basic components for home position detecting devices with adaptability for changing the form of screen plate 4. Thus, this type of apparatus does not require large scaling of components or complexity of parts. Moreover, the amount of required robot arm movement at initialization is reduced while effectively reducing manufacturing costs without sacrificing the detection precision of the apparatus. Thus, it is possible to detect the angular operating range through simple change of the screen plate 4 and, in addition, to restrict the required range of motion within the operating range of movement of the new screen plate.

Explanation of this invention is now directed to a modified example of the first embodiment involving detection of a position with the use of a linear motion shaft rather than a rotating shaft. FIGS. 9–11 are examples of this invention as applied to the linear stage type of robot.

FIG. 9 is an embodiment of a position detecting apparatus wherein stage 14 provides for linear motion in conjunction with rotation of a linear screw 11 supported on a base member 15. In FIG. 9, incremental encoder 2 is attached to motor 1 and both are supported on member 15. Linear screw 11 is connected to the output shaft of motor 1 through coupling 16. Linear screw 11 transfers the rotation of motor 1 and has a pitch that effectively reduces the amount of linear stage movement relative to the rotational angle of motor 1. Movable stage 14 is mounted on linear screw 11 and magnetic sensor 13 on stage 14 is fixed beneath the stage for passage relative to screen plate 12. Screen plate 12 has concave and convex portions at equally spaced intervals which are located along and adjacent to the path of movement of magnetic sensor 13.

Linear screw 11 rotates with the rotation of motor 1 and, as a result, stage 14 provides for linear motion along linear screw 11 in either direction as indicated by the arrow in FIG. 9. Accompanying this linear motion, a binary signal corresponding to a position along linear screen plate 12 is provided as an output from magnetic sensor 13. Since the position detecting method of this linear motion embodiment is the same as that for the rotational motion embodiment of FIG. 3, explanation of the calculation method of the amount of movement is omitted here.

FIG. 10 illustrates a modified form of the position detecting apparatus of FIG. 9 wherein movable stage 14 includes encoder 2 as well as motor 1. In FIG. 10, incremental encoder 2 is attached to motor 1 and the output shaft of motor 1 is connected to a ball-screw nut (not shown) through timing belt 17. This ball-screw nut is threadably supported on linear screw 11. The ball-screw nut and linear screw 11 translate the rotational motion of motor 1 to linear motion of stage 14 on screw 11 and has a pitch that effectively reduces the amount of linear stage movement relative to the rotational angle of motor 1. The arrangement for magnetic sensor 13 and screen plate 12 are the same as that illustrated in FIG. 9.

When motor 1 rotates, the ball-screw nut also rotates and, as a result, stage 14 provides for linear motion on linear screw 11 in either direction as indicated by the arrow in FIG. 10. Accompanying this linear motion, a binary signal corresponding to a position of screen plate 12 is provided as output from magnetic sensor 13. Since the position detecting method of this linear motion embodiment is the same as that for the rotational motion embodiment of FIG. 3, explanation of the calculation method of the amount of movement is omitted here.

Although, in each of the two foregoing examples of FIGS. 9 and 10, magnetic sensor 13 is employed as a sensor for detecting the division points, other types of sensor may be employed, such as an optical sensor. However, since, in a linear motion apparatus of this type, a linear screw 11 is employed, lubrication between linear screw 11 and movable stage 14 is generally required. Since the lubricant may be easily scattered or deposited on adjacent components of the apparatus, is possible that in the case of employing an optical sensor, its light path may be at least partially blocked by adhesion of particles of lubricant to the optical sensor or to edges of the concave and convex portions of screen plate 12. Therefore, it is desirable to employ a sensor in these embodiments not sensitive to influences of the lubricant. The magnetic sensor is, therefore, appropriate in these embodiments since no significant negative impact on signal detection occurs due to the presence of the scattered lubricant.

FIG. 11 is another embodiment involving linear motion detection utilizing the movement of a belt 19. In FIG. 11, incremental encoder 2 is attached to motor 1 and the output shaft of motor 1 is connected, via reduction gear 20, to drive endless, closed loop belt 19 which is moveable along an endless track via a pulley system (not shown). In addition, the stage (not shown) is fixed to belt 19. Further, along a side of belt 19, concave and convex screen portions 18 are formed in the surface of the belt. Photosensor 5 is attached to a fixed support (not shown) adjacent to screen portions 18. Therefore, in this embodiment, photosensor 5 is not attached to a moving stage but is attached to a fixed member separate from the stage.

When motor 1 of the stage is operated, belt 19 will linearly move with linear motion in either direction as indicated by the arrow in FIG. 11, depending upon the direction of operation of motor 1. Accompanying this linear motion of the belt, a binary signal corresponding to a position of screen portion 18 is provided as output from fixed photosensor 5. Since the position detecting method of this linear motion embodiment is the same as that for the rotational motion embodiment of FIG. 3, explanation of the calculation method of the amount of movement is omitted here. The magnetic sensor may also be employed in this embodiment even though the reason recommending its use in the embodiment of FIG. 10 does not apply in this embodiment.

[Second Embodiment]

A second embodiment of this invention will be described with reference to FIGS. 12 and 13. This embodiment provides for initial setting of the division points on the output shaft of the reduction gear at predetermined intervals which are not at equal intervals, as is the case of the first embodiment. Since the reference point on the incremental encoder is detected on every rotation of the incremental encoder, the intervals of the reference points are always detected as regular intervals. On the other hand, if an output pulse count, Pdef, measured from the time when a division point is detected to the time when a reference point is detected, and the position of a division point, or the reference point corresponding to this division point, will correspond to each other so that an absolute position of the division point or reference point can be obtained.

In FIG. 12, the positions of the division points are set so that the output pulse count, Pdef, relative to every sequentially adjacent division point is 5ΔPdef, 2ΔPdef, 1ΔPdef, 4ΔPdef, and 3ΔPdef, respectively. FIG. 12 shows that, in this case, the position of the output shaft of the reduction gear is obtained every rotation of the encoder shaft, as previously described. Therefore, it is optional to set the unit of rotations of the encoder shaft from which the measurement for angular output can be performed, i.e., the setting of m in expression (1). In this manner, even in the case where the division points on the output shaft are not at equal intervals, if the output pulse count corresponding to each division point and the output shaft angle correspond to each other, the division points set relative to the output shaft can be identified relative to each other within the operating range. Hence, the output shaft angle can be obtained through use of another data table.

FIG. 13 is a modified example of FIG. 12 of this embodiment. In this example, the positions of the division points are set so that each output pulse count and the angle of the output shaft correspond to each other in the same way as in the example of FIG. 12. However, the number of revolutions of the incremental encoder for the detection of the angle of the output shaft is not determined, and the rotation numbers of the encoder are mutually different. As shown in FIG. 13, the first output pulse count is 1ΔPdef, and the division point corresponding to this output pulse count is assigned as the reference point for the second rotation of the encoder shaft. The next output pulse count is 3ΔPdef, and the division point corresponding to this output pulse count is assigned as the reference point for the fourth rotation of the encoder shaft. Further, the next output pulse count is 2ΔPdef, and the division point corresponding to this output pulse count is assigned as the reference point for the ninth rotation of the encoder shaft. In this manner, it is possible that the intervals of the division points are set so that there are different intervals corresponding to the number of rotations of the encoder shaft.

In the foregoing second embodiments, the predetermined operation for the return-to-home position is performed within the operating range on the output shaft. However, this operation can be applied in the case where the operating range on the output shaft is not set and the output shaft may be moved through the full circumference of the screen plate. In addition, in case where the output shaft can be rotated a number of times, it is necessary to the design of the apparatus that the reference point on the encoder shaft be always set in a predetermined relation to the angle of the output shaft. Hence, the reduction ratio should be set so that the amount of movement per rotation of the output shaft is divisible into units by the amount of movement per rotation of the encoder shaft. Of course, in this case, the operating range of the output shaft is restricted and the output shaft is always controlled to remain within the operating range. However, it is not necessary to restrict the relation between the output shaft and encoder shaft as described in the foregoing second embodiments.

In summary, the embodiments of present invention provide the following attributes.

In a first attribute of the position detecting apparatus of this invention, the apparatus is capable measuring the output pulse count from the movement of a moving mechanism connected to a reduction gear employing the count pulse of an incremental encoder through detected equally spaced division points of the moving mechanism relative to one rotation of an encoder shaft. The amount of movement required of the moving mechanism for initialization is sharply reduced and, therefore, the time required for such movement is reduced, while the position of the moving mechanism can be accurately detected from the output pulse count without sacrificing detection precision.

In a second attribute of the position detecting apparatus of this invention, the method of calculating the position of the moving mechanism includes the steps of retaining the set values and information relative to the position of the moving mechanism in memory means, and obtaining the shaft output position corresponding to the output pulse count with the stored values so that complicated arithmetic processing is unnecessary.

In a third attribute of the position detecting apparatus of this invention, the division points of the moving mechanism are set at equal intervals and the period of the division points is set different from the period of the encoder reference point. As a result, the position of the moving mechanism can be easily determined through retention of parameters that relate to the relation between the period of the division points and the period of the reference points.

In a fourth attribute of the position detecting apparatus of this invention, the position detecting apparatus which can be initialize in a rapid manner and the range of movement for position detection of the moving mechanism can be made small.

In a fifth attribute of the position detecting apparatus of this invention, the detection of the output shaft position is based on either specified division point detection or on set values, and the detected value of the position of the incremental encoder at a position corresponding to the division point detecting mechanism can be determined. Since position determination can be achieved within the detection precision of the incremental encoder, regardless of the manufacturing precision of the division points, the precision of initialization can be improved with the use of a less expensive division point detecting mechanism.

In a sixth attribute of the position detecting apparatus of this invention, the division point detecting mechanism can be utilized to also provide information about the transient state of the detected signal. Therefore, specification of the division point or the set value is simplified, and the degree of freedom is increased for determining the division point or the set value. Since it possible to individually identify each division point through a combination of information relative to both the transient state and an indication of a division point, the amount of detected information required for position determination is reduced.

In a seventh attribute of the position detecting apparatus of this invention, the motion range of the moving mechanism for division point detection can be restricted, and the division points of the moving mechanism can be set within the smaller range.

In an eighth attribute of the position detecting apparatus of this invention, the performance of the operation for return-to-home position as well as initialization can be performed simultaneously through the use of means for detecting the limits of the operating or motion range of movement, and movement of the moving mechanism toward a position within the motion range in the case where the moving mechanism is presently outside of the motion range.

In a ninth attribute of the position detecting apparatus of this invention, it is not necessary to utilize an additional sensor, in addition to the sensor used for detecting the detection intervals of the division points of the moving mechanism, for determining the end boundaries of the motion range of detected movement. Therefore, the provision of an additional mounting position for another sensor is unnecessary so that manufacturing costs are not unnecessarily increased.

In a tenth attribute of the position detecting apparatus of this invention, the apparatus is designed so that the moving mechanism always moved in a direction to be within the motion range when the moving mechanism is at the end of the motion range, and will always detect a division point within the motion range when the moving mechanism is being moved within the motion range. Therefore, the moving mechanism can be controlled in a manner not to be outside of the motion range when the position of the moving mechanism is initialized.

In a eleventh attribute of the position detecting method of this invention, the amount of movement of the moving mechanism required for initialization can be reduced without sacrificing detection precision compared to that of conventionally known position detecting apparatus and, therefore, the required time for initialization is correspondingly reduced.

In a twelfth attribute of the position detecting method of this invention, the position of the output shaft can be determined against the output pulse count by setting of the corresponding predetermined relation between the output pulse count and the interval of the division points of the moving mechanism.

In a thirteenth attribute of the position detecting method of this invention, a plurality of adjacently disposed division points are detected wherein the detected signals are mutually different so that the output pulse count is different for every division point that is detected relative to the encoder signal. Hence, a plurality of division points are detected against a predetermined output pulse count and the division points can be individually detected relative to one another. Therefore, the allowable range of the division point detection error can be extended without increasing the amount movement necessary for initialization or the amount of movement necessary for initialization can be reduced while securing the allowable range for division point detection error.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A position detecting apparatus which has a first rotation shaft, an incremental encoder to measure the position of the first rotation shaft, and a moving mechanism that is connected to said first rotation shaft through a reduction gear, so as to detect the position of said moving mechanism based on output pulses from said incremental encoder, said position detecting apparatus comprising:

division point detecting means for detecting a plurality of division points that are set by dividing a motion range of said moving mechanism into a plurality of regions;

reference point detecting means for detecting a reference point set for said incremental encoder;

pulse counting means for counting output pulses of the incremental encoder between the time when said reference point is detected by said reference point detecting means and the time when said division point is detected by said division point detecting means while said first rotation shaft rotates to drive said moving mechanism; and position calculating means for calculating the position of said moving mechanism by materially comparing values that are measured by the pulse counting means with a set count value that is set for each of said division points, and specifying said division point or said set value;

wherein said division points are disposed so that said set values are different from each other at least in a predetermined position range of said moving mechanism.

2. The position detecting apparatus as claimed in claim 1 further comprising memory means for storing said set values and information regarding positions of said moving mechanism corresponding to said values as memory values, wherein said position calculating means is arranged to obtain said position corresponding to said division point or said set value that is specified according to the count value of output pulses counted by said pulse counting means, based on said memory values.

3. The position detecting apparatus as claimed in claim 1 wherein said division points are set at an equal period different from the period of said reference point for said incremental encoder.

4. The position detecting apparatus as claimed in claim 1 wherein said position calculating means is used only at initializing the position of said moving mechanism, so as to set the absolute value of said position, and after the initialization, the position of said moving mechanism is determined through accumulating the output pulses from said incremental encoder that are measured.

5. The position detecting apparatus as claimed in claim 1 wherein said position calculating means comprises specifying means for specifying said division point or said set value by comparing said set value with said count value, and initializing means for setting a position detected value from said incremental encoder to the position corresponding to said division point or said set value, based on said division point or said set value that is specified.

6. The position detecting apparatus as claimed in claim 1 wherein said division point detecting means is arranged so that the detection signal transits between a plurality of states across said division point as a boundary, and has identification means for identifying the transition direction of said detection signal, and wherein said position calculating means is arranged so as to specify said division point or said set value according to said count value and the specified transition direction.

7. The position detecting apparatus as claimed in claim 1 wherein the motion range of said moving mechanism is restricted and a plurality of said division points are set within the motion range.

8. The position detecting apparatus as claimed in claim 7 comprising range detecting means for detecting whether said moving mechanism is within said motion range, said moving mechanism being moved to be always within the motion range if said moving mechanism is out of said motion range.

9. The position detecting apparatus as claimed in claim 7 comprising range detecting means for detecting whether said moving mechanism is within said motion range, wherein said division points being arranged at intervals which are different according to whether inside or outside said motion range, said range detecting means detecting the interval so as to discriminate between inside and outside the motion range.

10. The position detecting apparatus as claimed in claim 7 wherein the output from said division point detecting sensor taking a first state when said moving mechanism is at one end of said motion range, and a second state when the same is at the other end of the motion range, and that said moving mechanism is moved toward said other end if the output from said division point detecting sensor is in the first state, and toward said one end if the output from said division point detecting sensor is in the second state, during counting of said output pulses.

11. The position detecting apparatus as claimed in claim 1, wherein said moving mechanism is a second rotary shaft, and the position is detected in terms of rotation angle of the second rotary shaft.

12. The position detecting apparatus as claimed in claim 1 wherein said moving mechanism is a linear motion shaft, and the position is detected in terms of the moving distance or travel of the linear motion shaft.

13. A position detecting method that determines the position of a moving mechanism, using an incremental encoder that is connected to the moving mechanism through a reduction gear, said position detecting method comprising the steps of:

determining beforehand a positional relation between division points set in the motion range of said moving mechanism and reference points on said incremental encoder;

measuring the output pulse count from said incremental encoder between the time when a division point is detected and the time when a reference point on said incremental encoder is detected;

specifying said division point corresponding to the output pulse count, based on said positional relation; and calculating the position of said moving mechanism, based on the specified division point.

14. The position detecting method as claimed in claim 13 wherein a correspondence relation of 1:1 is set between said output pulse counts and said division points.

15. The position detecting method as claimed in claim 13 comprising the steps of detecting a group of a plurality of said division points that are adjacent to each other among division points on said moving mechanism to provide different detection signals for different division points, and allocating different numbers of output pulses of said incremental encoder to different groups of adjacent division points.

16. The position detecting method as claimed in claim 13 wherein said moving mechanism is a second rotary shaft, and the position is detected in terms of a rotation angle of the second rotation shaft.

17. The position detecting method as claimed in claim 13 wherein said moving mechanism is a linear motion shaft, and the position is detected in terms of a moving distance of the linear motion shaft.

* * * * *